United States Patent [19]

Tsujimura et al.

[11] Patent Number: 4,693,641
[45] Date of Patent: Sep. 15, 1987

[54] END MILL WITH THROW-AWAY TIP

[75] Inventors: Osamu Tsujimura; Takayoshi Saito; Tatsuo Arai, all of Tokyo, Japan

[73] Assignee: Mitsubishi Kinzoku Kabushiki Kaisha, Tokyo, Japan

[21] Appl. No.: 815,055

[22] Filed: Dec. 31, 1985

[30] Foreign Application Priority Data

Oct. 25, 1985 [JP] Japan .............................. 60-163962[U]
Oct. 25, 1985 [JP] Japan .............................. 60-163963[U]
Nov. 6, 1985 [JP] Japan .............................. 60-170488[U]

[51] Int. Cl.$^4$ .............................................. B23C 5/20
[52] U.S. Cl. ........................................ 407/42; 407/53; 407/54; 407/113; 407/114; 408/205; 408/713
[58] Field of Search ..................... 407/42, 53, 54, 113, 407/114, 36; 408/186, 199, 713, 224, 203.5, 204–207

[56] References Cited

U.S. PATENT DOCUMENTS

| | | | |
|---|---|---|---|
| 3,486,211 | 12/1969 | Greenleaf | 407/42 |
| 3,551,978 | 1/1971 | Berry, Jr. | |
| 3,896,532 | 7/1975 | Brooks | 407/42 |
| 4,077,735 | 3/1978 | Dick et al. | 407/113 |
| 4,131,383 | 12/1978 | Powers | 407/114 |
| 4,188,162 | 2/1980 | Zweekly | 407/114 |
| 4,220,429 | 9/1980 | Powers et al. | 407/114 |
| 4,278,373 | 7/1981 | Wolfe, III | 407/114 |
| 4,367,991 | 1/1983 | Grafe et al. | 408/713 |
| 4,373,839 | 2/1983 | Negishi et al. | 408/205 |
| 4,529,339 | 7/1985 | Shimomura et al. | 407/42 |
| 4,616,964 | 10/1986 | Nomura | 408/230 |

FOREIGN PATENT DOCUMENTS 2012735 11/1971 Fed. Rep. of Germany .
3119189 12/1982 Fed. Rep. of Germany .
3417168 11/1984 Fed. Rep. of Germany .

Primary Examiner—Nicholas P. Godici
Assistant Examiner—Jerry Kearns
Attorney, Agent, or Firm—Cushman, Darby & Cushman

[57] ABSTRACT

An end mill comprises an end mill body and a throw-away tip mounted on a forward end of the end mill body so as to be spaced from an axis thereof. A core receiving recess is formed at a center of a forward end face of the end mill body and has a size equal to or greater than a distance between the throw-away tip and the axis of the end mill body. The throw-away tip has an end cutting edge formed by a cutting edge ridge located adjacent the forward end of the end mill body and extending from an outer peripheral side of the end mill body toward an inner peripheral side thereof, and outer and inner peripheral cutting edges respectively formed by cutting edge ridges respectively extending from outer and inner peripheral ends of the end cutting edge toward a rearward end of the end mill body. The end mill body may mount at least two throw-away tips disposed symmetrically with respect to the axis thereof.

27 Claims, 52 Drawing Figures

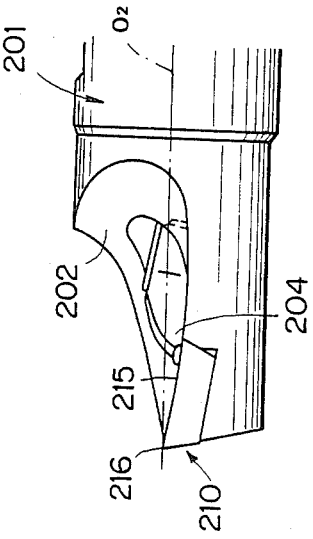
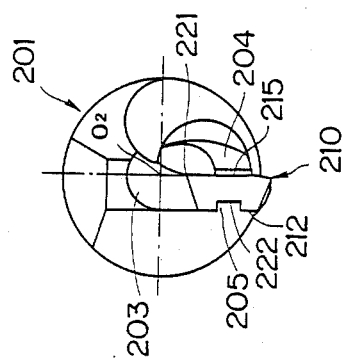
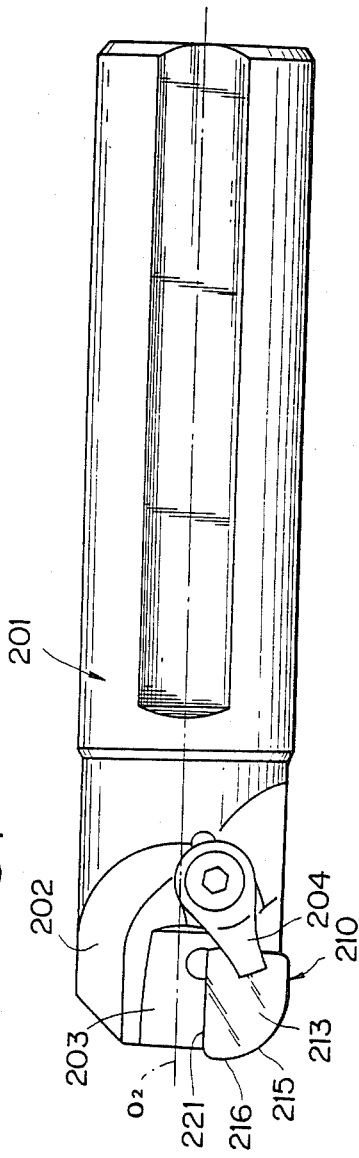

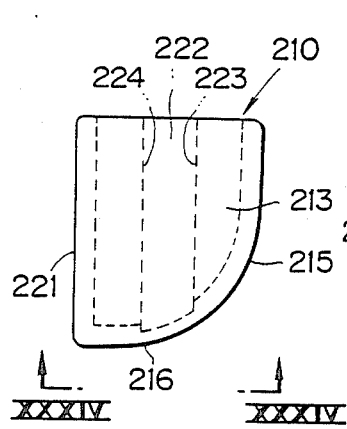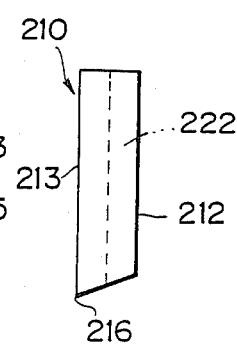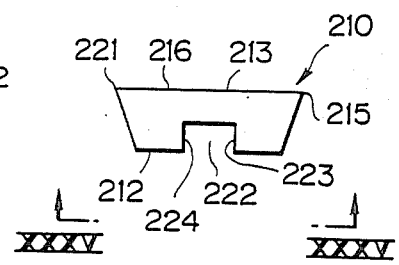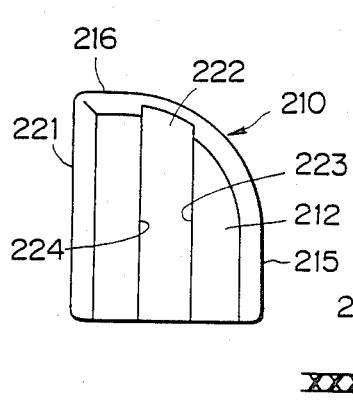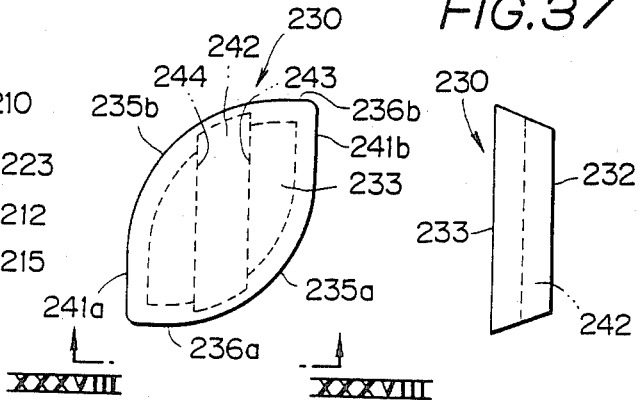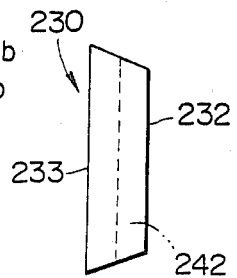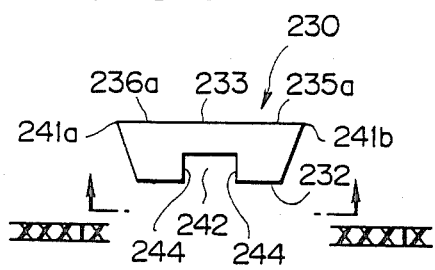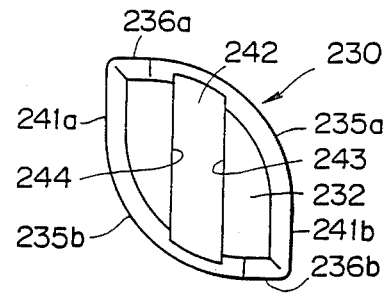

END MILL WITH THROW-AWAY TIP

BACKGROUND OF THE INVENTION

1. Field of the Invention

The present invention relates to an end mill which is capable of performing an axial cutting and a cross feed cutting with a throw-away tip mounted on a forward end of an end mill body.

2. Related Art Statement

FIGS. 1 and 2 of the accompanying drawings show an example of a conventional end mill in which a single throw-away tip is mounted on a forward end of an end mill body 1. The end mill shown in FIGS. 1 and 2 is arranged such that a throw-away tip 2 of a square shape is detachably mounted on a forward end of the end mill body 1. A cutting edge ridge of the tip 2 located at a forward end thereof and extending from an outer peripheral side of the end mill body 1 toward an inner peripheral side thereof forms an end cutting edge 2a, and a cutting edge ridge extending from an outer peripheral end of the end cutting edge 2a toward a rearward end of the end mill body 1 in the direction of an axis O forms a peripheral cutting edge 2b.

In the end mill described above, the end cutting edge 2a is formed in spaced or offset relation to the axis O, as clearly seen from FIG. 1. This, when an axial cutting is performed on a workpiece, would cause a columnar core, which is a portion of the workpiece remaining uncut, to be formed at a center of rotation, and the core would impinge against the tip 2. Accordingly, the end mill has an inconvenience that it would be incapable of performing the axial cutting.

FIGS. 3 and 4 show another example of a conventional end mill in which an end cutting edge 12a of a throw-away tip 12 is formed so as to extend across an axis O of an end mill body. With such tip 12, no core would be formed at a center of rotation, and it would be possible to perform both an axial cutting and a cross feed cutting.

In the end mill illustrated in FIGS. 3 and 4, however, a cutting speed at a portion of the end cutting edge 12a located adjacent the axis O is extremely low and, furthermore, when the axial cutting is performed, an excessive thrust load is applied to the portion of the end cutting edge 12a. This would cause a problem that the portion of the end cutting edge 12a adjacent the axis O is chipped or fractured. In addition, since the end cutting edge 12a is formed so as to extend across the axis O, the diameter of the end mill is subject to restriction by the size of the throw-away tip 12. In other words, a problem would occur that if the end mill is desired to have an increased diameter, the tip 12 must also have an increased size.

OBJECT AND SUMMARY OF THE INVENTION

An object of the present invention is to provide an end mill capable of performing an axial cutting and a cross feed cutting with a throw-away tip, by means of which problems can be solved that a portion of an end cutting edge adjacent an axis of an end mill body is chipped or fractured and that the throw-away tip having an increased size is required to be utilized with an increase in diameter of the end mill body.

According to an aspect of the present invention, there is provided an end mill comprising an end mill body having an axis and having forward and rearward ends; throw-away cutting means mounted at the forward end of the end mill body so as to be spaced from the axis of the end mill body; the end mill body having a core receiving recess formed at a center of an end face of the end mill body at the forward end thereof, the core receiving recess having a size thereof at least equal to a distance between the axis of the end mill body and the throw-away cutting means; and the throw-away cutting means having a plurality of cutting edge ridges, a first one of the cutting edge ridges being located adjacent the end face of the end mill body and extending from an outer peripheral side of the end mill body toward an inner peripheral side thereof to form an end cutting edge, and second and third ones of the cutting edge ridges respectively extending from outer and inner peripheral ends of the end cutting edge toward the rearward end of the end mill body to form outer and inner peripheral cutting edges, respectively. The throw-away cutting means may comprise at least two throw-away tips disposed symmetrically with respect to the axis of the end mill body.

BRIEF DESCRIPTION OF THE DRAWINGS

FIG. 29 is a view similar to FIG. 5, but showing a seventh embodiment of the present invention;

FIG. 30 is a fragmental side elevational view of an end mill shown in FIG. 29;

FIG. 31 is a plan view of the end mill shown in FIG. 29;

FIG. 32 is a plan view of a throw-away tip shown in FIGS. 29 through 31;

FIG. 33 is a side elevational view of the tip shown in FIG. 32;

FIG. 34 is a view as viewed from the arrows XXXIV—XXXIV in FIG. 32;

FIG. 35 is a view as viewed from the arrows XXXV—XXXV in FIG. 34.;

FIG. 36 is a plan view of a throw-away tip used in an eighth embodiment of the present invention, with an end mill body being omitted;

FIG. 37 is a side elevational view of the tip shown in FIG. 36;

FIG. 38 is a view as viewed from the arrows XXXVIII—XXXVIII in FIG. 36;

FIG. 39 is a view as viewed from the arrows XXXIX—XXXIX in FIG. 38;

DETAILED DESCRIPTION OF THE PREFERRED EMBODIMENTS

Figure 1:
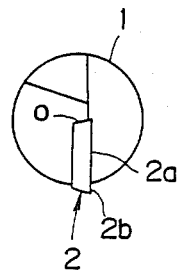
FIG. 1 is an end view of a conventional end mill having mounted thereon a throw-away tip.
Figure 2:
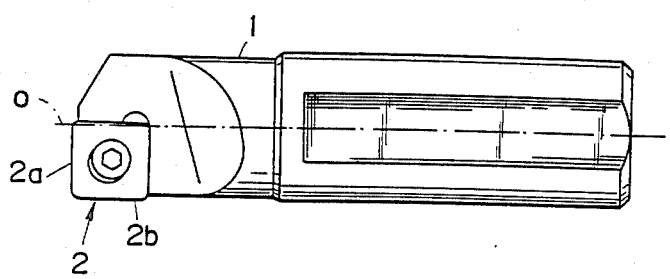
FIG. 2 is a plan view of the end mill shown in FIG. 1.
Figure 3:
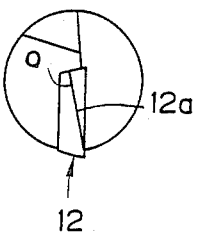
FIG. 3 is an end view of another conventional end mill.
Figure 4:
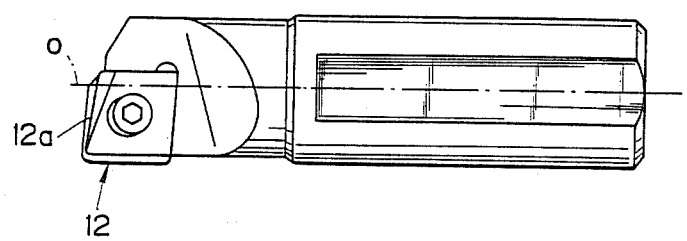
FIG. 4 is a plan view of the end mill shown in FIG. 3.
Figure 5:
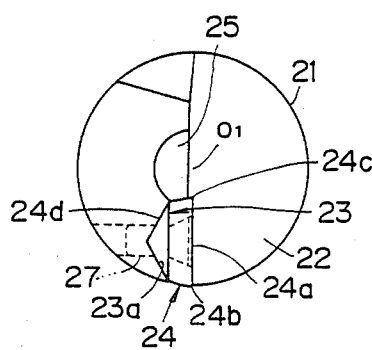
FIG. 5 is an end view of an end mill in accordance with a first embodiment of the present invention.
Figure 6:
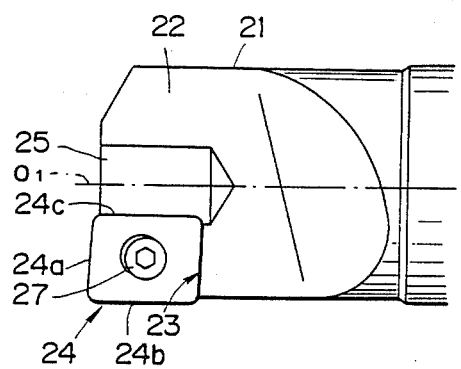
FIG. 6 is a fragmental plan view of the end mill shown in FIG. 5.

FIGS. 5 and 6 show an end mill in accordance with a first embodiment of the present invention. The end mill comprises a columnar end mill body 21 having a forward end section thereof an approximately half portion of which is cut away to form a chip pocket 22. A tip seat 23 having a V-shaped cross-sectional bottom surface 23a is formed at an outer peripheral portion of a forward end of a wall surface which defines the chip pocket 22. A throw-away tip 24 is detachably secured to the tip seat 23 by a clamping screw 27 in such a manner as to be spaced from an axis $O_1$ of the end mill body 21.

The throw-away tip 24 is in the form of a parallelogram, and has four cutting edge ridges of which first one is located adjacent a forward end face of the end mill body 21 and extends from an outer peripheral side of the body 21 toward an inner peripheral side thereof to form an end cutting edge 24a, and second and third ones of which respectively extend from outer and inner peripheral ends of the end cutting edge 24a toward a rearward end of the end mill body 21 in the direction of the axis $O_1$ to form outer and inner peripheral cutting edges 24b and 24c, respectively. The end cutting edge 24a is inclined toward the rearward end of the end mill body 21 as the edge 24a approaches the axis $O_1$. The outer peripheral edge 24b extends in parallel to the axis $O_1$ or is inclined within an extent of approximately 30' toward the axis $O_1$ as the edge 24b approaches the rearward end of the end mill body 21. The inner peripheral edge 24c is inclined toward the axis $O_1$ as the edge 24c approaches the rearward end of the end mill body 21. In addition, in order to prevent the tip 24 from being moved or shifted by a cutting resistance during a cutting operation of the end mill, the tip 24 has a lower surface 24d which is formed into a V-shaped cross-section complementary to the bottom surface 23a of the tip seat 23. Additionally, the tip 24 has a radial rake angle set to 0 to 5 degrees, and an axial rake angle set to 5 to 10 degrees.

A core receiving recess 25 is formed at a center of the forward end face of the end mill body 21 so as to extend in the direction of the axis $O_1$. The core receiving recess 25 is provided for receiving therein a core formed on a workpiece due to the fact that the tip 24 is spaced from the axis $O_1$. The recess 25 is formed into a semicircular shape, because the approximately half portion is cut away from the forward end section of the end mill body 21. A distance from the axis $O_1$ to a wall surface of the core receiving recess 25, i.e., a radius of the recess 25 is set to a value equal to or greater than a distance from the axis $O_1$ to the inner peripheral end of the end cutting edge 24a.

Figure 7:
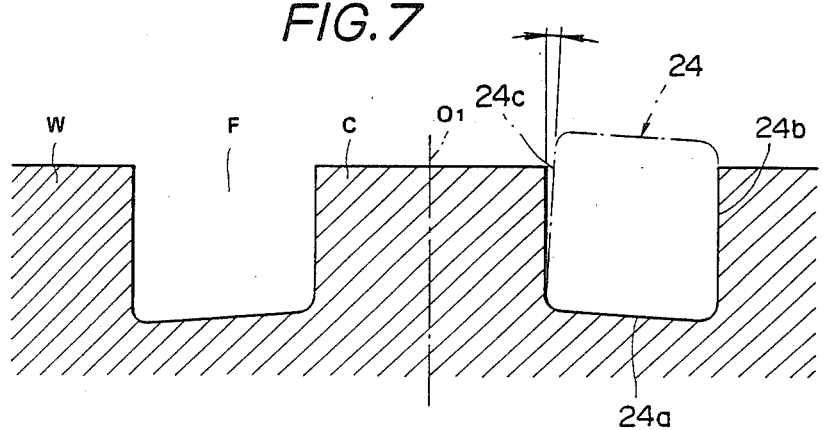
FIG. 7 is a cross-sectional view illustrating a workpiece on which an axial cutting is performed by the end mill shown in FIGS. 5 and 6.

When an axial cutting is performed by the end mill described above, an annular groove F is cut and formed in a workpiece W by the end cutting edge 24a of the throw-away tip 24, as shown in FIG. 7. This causes a core C to be formed at a center of rotation, which core has a radius equal to the distance from the axis $O_1$ to the inner peripheral end of the end cutting edge 24a. The core C is progressively grown as the end mill is fed axially, and is received in the recess 25. Subsequently, the core C is cut away by the inner peripheral cutting edge 24c when a cross feed cutting is performed by the end mill. It is needless to say that in case where a mere cross feed cutting is performed, the cutting operation is performed by the outer peripheral cutting edge 24b.

Figure 8:
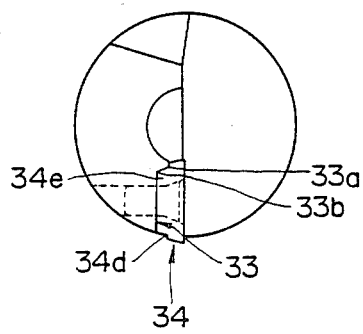
FIG. 8 is a view similar to FIG. 5, but showing a second embodiment of the present invention.

FIG. 8 shows an end mill in accordance with a second embodiment of the present invention, in which description of parts or components similar to those of the end mill shown in FIGS. 5 and 6 will be omitted to avoid duplication. An end mill body of the end mill has a concave portion or recess 33b formed in a bottom surface 33a of a tip seat 33, while a throw-away tip 34 has a lower surface 34d having formed thereon a convex portion or projection 34e which is snugly fitted in the recess 33b to prevent the tip 34 from being moved or shifted during the cutting operation.

Figure 9:
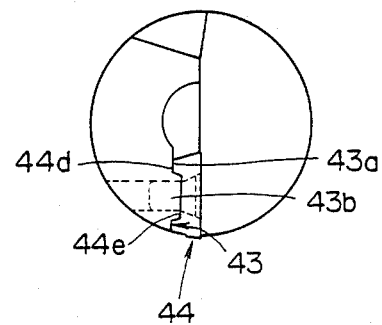
FIG. 9 is a view similar to FIG. 5, but showing a third embodiment of the present invention.

FIG. 9 shows an end mill in accordance with a third embodiment of the invention, in which description of parts or components similar to those of the end mill shown in FIGS. 5 and 6 will be omitted to avoid duplication. An end mill body of the end mill has a convex portion or projection 43b formed on a bottom surface 43a of a tip seat 43, while a throw-away tip 44 has a lower surface 44d having formed therein a concave portion or recess 44e in which the projection 43b is snugly fitted to prevent the tip 44 from being moved or shifted during the cutting operation.

FIGS. 10 through 16 show an end mill in accordance with a fourth embodiment of the present invention, which comprises an end mill body 101 having a chip pocket 102 and a core receiving recess 103. The end mill body 101 is substantially similar in structure to the end mill body 21 described previously with reference to FIGS. 5 and 6 and will not be described in detail for simplification. A throw-away tip, generally designated by the reference numeral 120, is detachably secured to the end mill body 101 by a clamping member 104.

As shown in detail in FIGS. 12 through 16, the throw-away tip 120 is in a form of a plate having an appearance of a parallelogram and has upper and lower surfaces 121 and 122 extending parallel to each other. The lower surface 122 forms a seating surface, and the upper surface 121 has four sides which form cutting edge ridges 123, 124, 125 and 126, respectively. The tip 120 is adapted such that the cutting edge ridge 123 or 126 is utilized as an end cutting edge when the tip 120 is mounted on a forward end of the end mill body 101, and each of the cutting edge ridges 124 and 125 with the cutting edge ridge 123 being positioned therebetween is utilized as an outer or an inner peripheral cutting edge.

The upper surface 121 of the tip 120 has a corner portion 127 defined by the cutting edge ridge 123 and the cutting edge ridge 125 which is utilized as an inner peripheral cutting edge when the cutting edge ridge 123 is utilized as an end cutting edge, and a corner portion 128 diagonally opposed to the corner portion 127. Each of the corner portions 127 and 128 is formed by such an inclined planar surface that a thickness of the tip 120 between the upper and lower surfaces 121 and 122 is progressively reduced from a central portion of the tip 120 toward the extremity of the corner portion 127, 128.

A groove 129 of a channel-shaped cross-section is formed in a central portion of the lower surface 122 of the tip 120 so as to extend along the axis of the end mill body 101. When the tip 120 is mounted on the end mill body 101, the groove 129 receives an elongated projection formed on the surface of the tip seat (see FIG. 10) of the end mill body 101. In this case, side walls of the groove 19 form abutment surfaces 129a and 129b which receive component forces of the cutting feed from the cutting edges 124 and 135, respectively.

Figure 11:
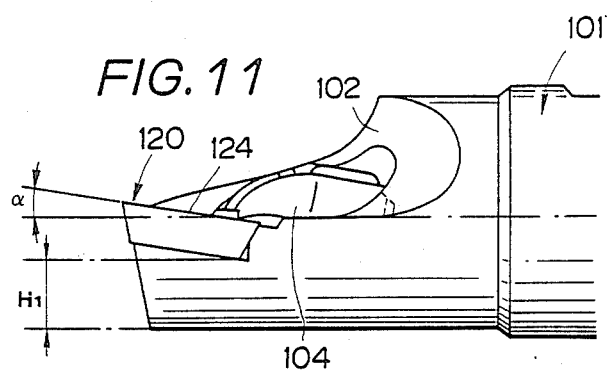
FIG. 11 is a fragmental side elevational view of an end mill shown in FIG. 10.
Figure 12:
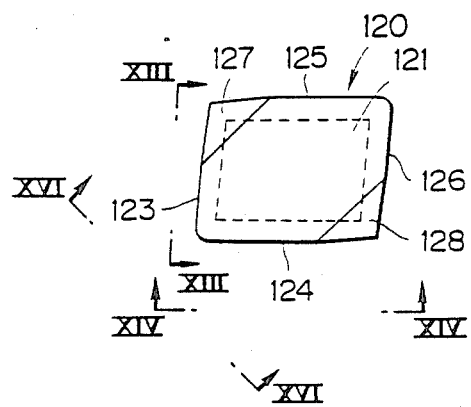
FIG. 12 is a plan view of a throw-away tip shown in FIGS. 10 and 11.
Figure 13:
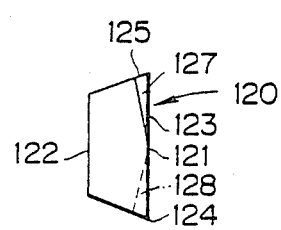
FIG. 13 is a view as viewed from the arrows XIII—XIII in FIG. 12.
Figure 14:
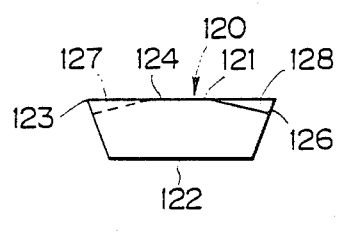
FIG. 14 is a view as viewed from the arrows XIV—XIV in FIG. 12.
Figure 15:
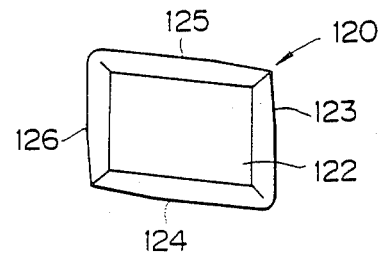
FIG. 15 is a bottom view of the tip shown in FIG. 12.
Figure 16:
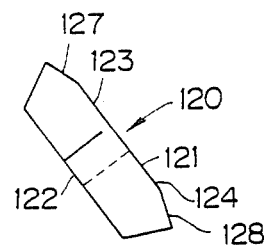
FIG. 16 is a view as viewed from the arrows XVI—XVI in FIG. 12.

As shown in FIG. 11, the tip 120 is attached to the end mill body 101 such that a radial rake angle at the cutting edge ridge 124 when utilized as an outer peripheral cutting edge is rendered negative, and a positive axial rake angle $\alpha$ is applied to the cutting edge ridge 124, in order to have an increased amount of back metal $H_1$.

Figure 17:
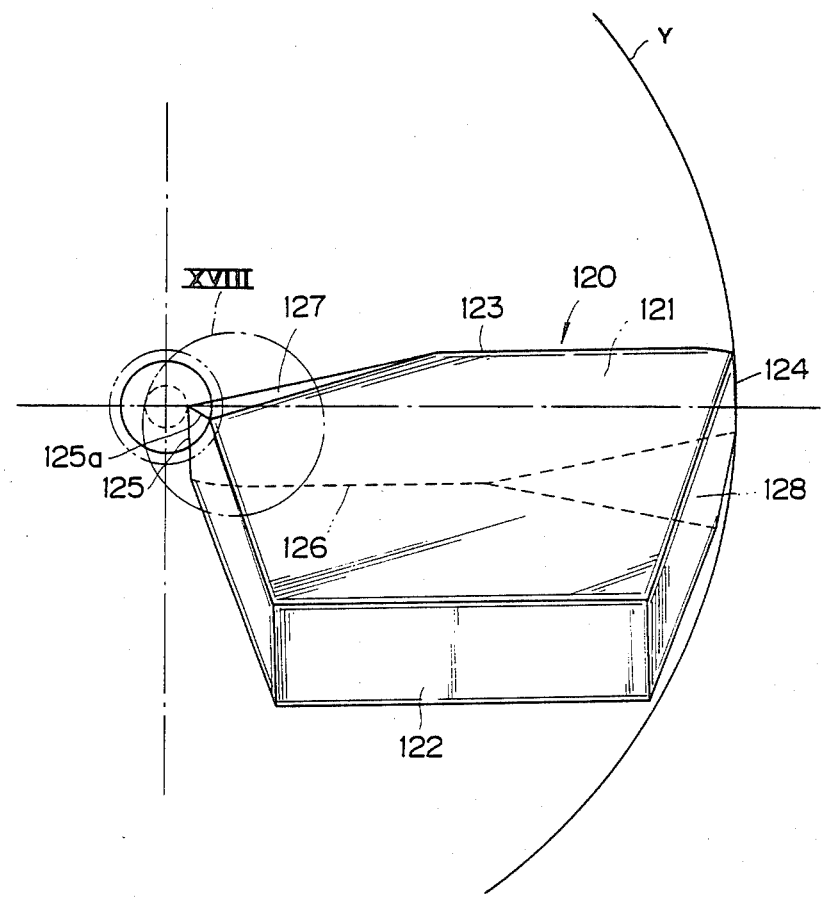
FIG. 17 is a diagrammatical perspective view showing an attached condition of the tip shown in FIG. 12.
Figure 18:
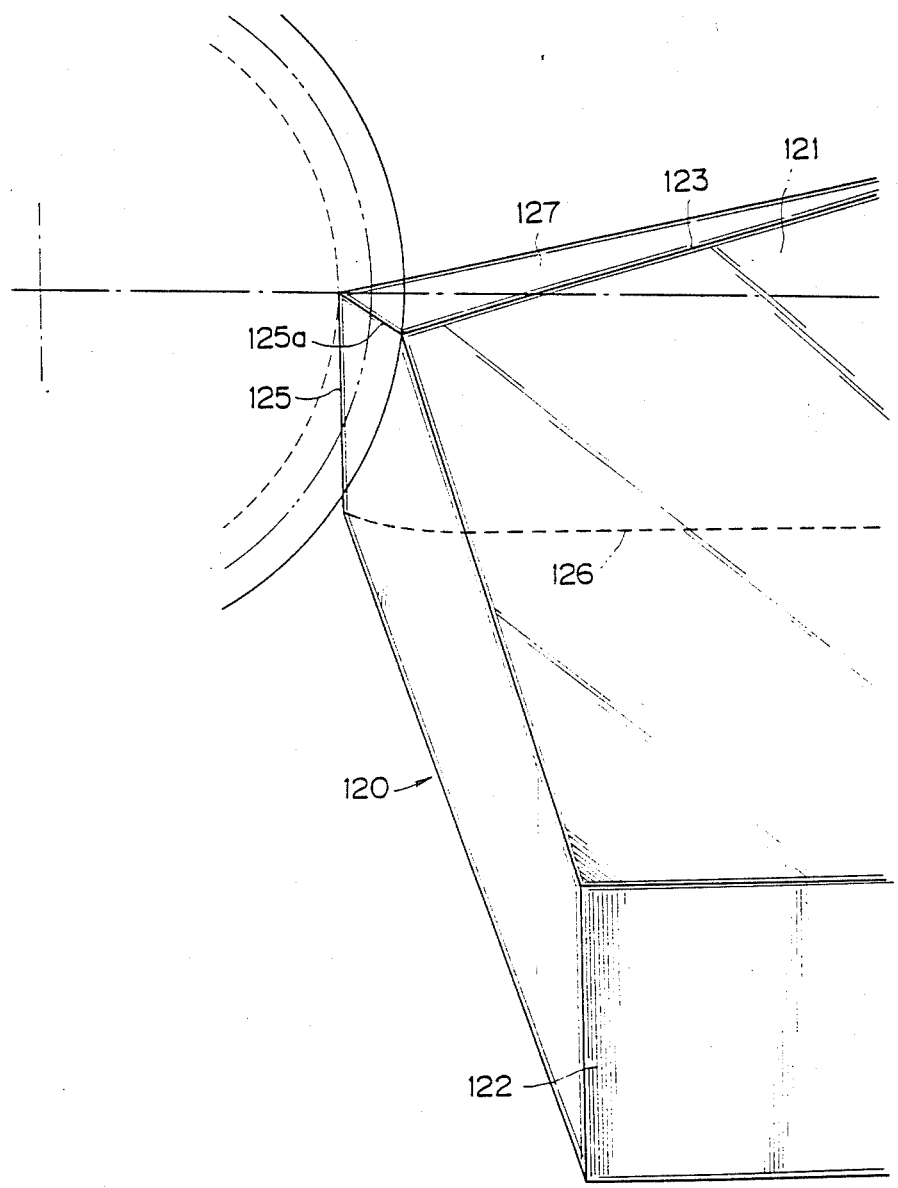
FIG. 18 is an enlarged fragmental perspective view of a portion encircled by the character XVIII in FIG. 17.
Figure 19:
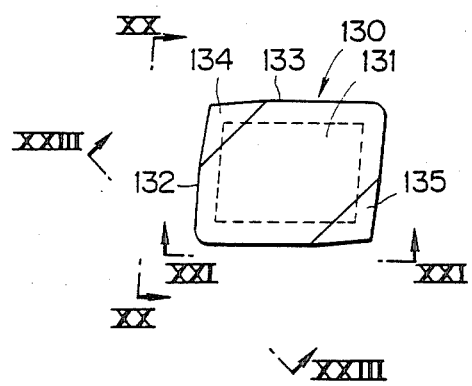
FIG. 19 is a plan view showing a throw-away tip used in a fifth embodiment of the present invention, with an end mill body being omitted.
Figure 20:
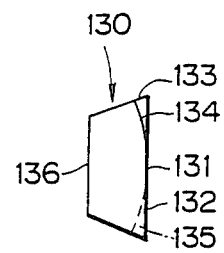
FIG. 20 is a view as viewed from the arrows XX—XX in FIG. 19.
Figure 21:
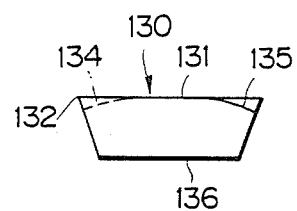
FIG. 21 is a view as viewed from the arrows XXI—XXI in FIG. 19.
Figure 22:
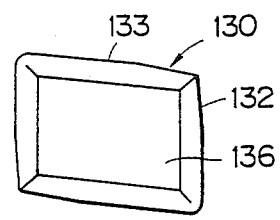
FIG. 22 is a bottom view of the tip shown in FIG. 19.
Figure 23:
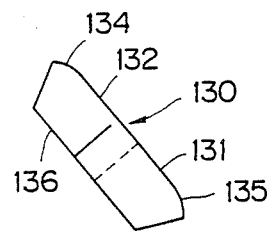
FIG. 23 is a view as viewed from the arrows XXIII—XXIII in FIG. 19.
Figure 24:
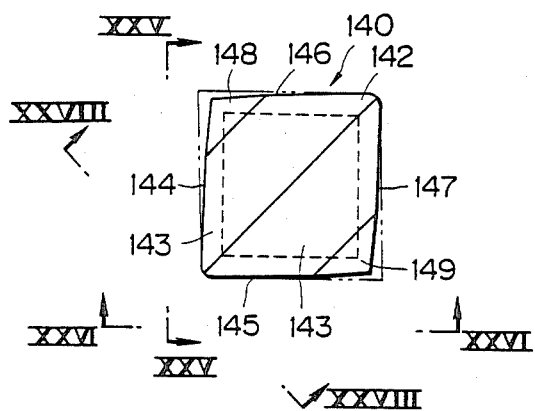
FIG. 24 is a plan view of a throw-away tip used in a sixth embodiment of the present invention, with an end mill body being omitted.
Figure 25:
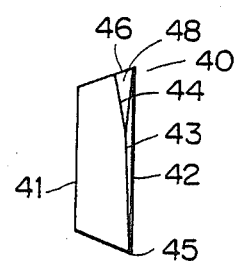
FIG. 25 is a view as viewed from the arrows XXV—XXV in FIG. 24.
Figure 26:
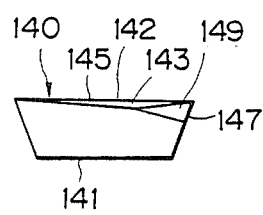
FIG. 26 is a view as viewed from the arrows XXVI—XXVI in FIG. 24.
Figure 27:
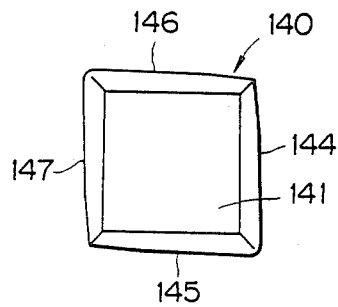
FIG. 27 is a bottom view of the tip shown in FIG. 24.
Figure 28:
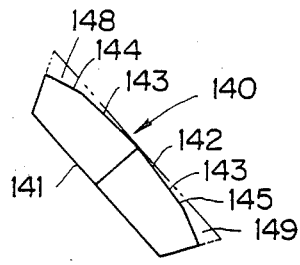
FIG. 28 is a view as viewed from the arrows XXVIII—XXVIII in FIG. 24.

As shown in FIGS. 17 and 18, even in case where the tip 120 having the above-described geometric configuration is mounted on the end mill body 101 such that the cutting edge ridge 124 utilized as an outer peripheral cutting edge is rendered negative, it is possible to restrict the radial rake angle at a forward end 125a of the cutting edge ridge 125 utilized as an inner peripheral edge so as not to be increased in the positive direction, because the corner portion 127 of the upper surface 121 adjacent the forward end 125a of the cutting edge ridge 125 is formed by the inclined planar surface. Accordingly, should the end mill body 101 have an increased amount of back metal $H_1$, it would not be required to previously form a tip clearance angle at the forward end 125a of the cutting edge ridge 125 utilized as an inner peripheral cutting edge, to an increased value, and it would be possible to avoid an occurrence of a so-called relief abutment or impingement. Thus, it would be possible to have a high tip strength over the entire length of the cutting edge ridge 125.

In addition, since the corner portion 128 of the upper surface 121, which is diagonally opposed to the corner portion 127 at the forward end 125a of the cutting edge ridge 125 and which is located at a rearward end of the cutting edge ridge 124 utilized as an outer peripheral cutting edge, is formed by the similar inclined planar surface, it is possible, as a result, to bring a locus of rotation of each point on the cutting edge ridge 124 utilized as the outer peripheral cutting edge, into conformity with a substantially identical circumference Y. This causes a working surface of a workpiece being cut to further approach a right angle, to thereby make it possible to improve the cutting accuracy. Furthermore, since the corner portions 127 and 128 are both formed by the inclined planar surface and the tip 120 per se is formed into a configuration of a symmetry of revolution through 180 degrees, when one of the cutting edge ridges 124 utilized as the outer peripheral cutting edge is worn off, the tip 120 can be reversed through 180 degrees so that the cutting edge ridge 126 is utilized as an end cutting edge. This enables the cutting edge ridge 125 opposed to the cutting edge ridge 124 to be utilized as an outer peripheral cutting edge. Thus, there is provided a high or superior economy.

Figure 10:
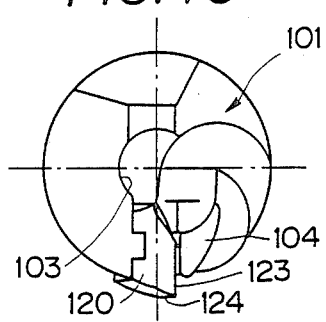
FIG. 10 is a view similar to FIG. 5, but showing a fourth embodiment of the present invention.

FIGS. 19 through 23 show only a throw-away tip 130 for use in an end mill in accordance with a fifth embodiment of the present invention, with an end mill body substantially identical with that shown in FIGS. 10 and 11 being omitted to avoid duplication. The tip 130 has an upper surface 131 which has a corner portion 134 defined by a cutting edge ridge 132 utilized as an end cutting edge and a cutting edge ridge 133 utilized as an inner peripheral cutting edge when the tip 130 is mounted on the end mill body, and a corner portion 135 diagonally opposed to the corner portion 134. Each of the corner portions 134 and 135 is formed by a convexly curved, inclined surface so that a thickness of the tip 130 between the upper surface 131 and a lower surface 136 is progressively reduced toward the extremity of the corner portion 134, 135.

FIGS. 24 through 28 show only a throw-away tip 140 for use in an end mill in accordance with a sixth embodiment of the present invention, with an end mill body substantially identical with that shown in FIGS. 10 and 11 being omitted. The tip 140 is in the form of a plate of a generally square shape having a lower surface 141 utilized as a seating surface. An upper surface 142 of the tip 140 is formed so as to have two inclined planar surface sections 143 and 143, with a single diagonal ridgeline being located therebetween, so that the tip 140 takes a form of a rhombus as viewed in plan. The upper surface 142 has four sides which are formed into cutting edge ridges 144, 145, 146 and 147, respectively. Each of corner portions 148 and 149 of the upper surface 142 with the diagonal ridgeline being positioned therebetween is formed by an inclined planar surface such that a thickness of the tip 140 between the upper and lower surfaces 141 and 142 is progressively reduced toward the extremity of the corner portion 148, 149. When the tip 140 is mounted on the end mill body, the cutting edge ridge 144 or 147 is utilized as an end cutting edge, and the cutting edge ridge 145 or 146 is utilized as an inner or an outer peripheral cutting edge.

It will be readily appreciated that the throw-away tips 130 and 140 in accordance with the fifth and sixth embodiments shown in FIGS. 19 through 23 and FIGS. 24 through 28 can provide unexpected meritorious results similar to those described with reference to the fourth embodiment shown in FIGS. 10 through 18.

FIGS. 29 through 35 show an end mill in accordance with a seventh embodiment of the present invention, which comprises an end mill body 201 having a chip pocket 202 and a core receiving recess 203. The end mill body 201 is substantially similar in structure to the end mill body 21 described with reference to FIGS. 5 and 6 and will not be described here in detail to avoid duplication. A throw-away tip, generally designated by the reference numeral 210, is detachably secured to the end mill body 201 by a clamping member 204.

As shown in detail in FIGS. 32 through 35, the throw-away tip 210 is in the form of a plate and has a lower surface 212 which forms a seating surface, and an upper surface 213 which forms a flank. A generally arcuate, convexly curved outer peripheral cutting edge 215 is formed at a ridgeline of the upper surface 213 located at an outer peripheral side of the end mill body 201. A linearly extending end cutting edge 216 is formed at a ridgeline of the upper surface 213 located adjacent a forward end of the end mill body 201. As shown in FIGS. 29 through 31, the tip 210 is mounted on the end mill body 201 so as to have the end cutting edge 216 spaced from an axis $O_2$ thereof. The tip 210 has an inner peripheral cutting edge 221 formed along a ridgeline of the upper surface 213 located at an inner peripheral side when the tip 210 is mounted on the end mill body 201. In addition, a groove 222 having a U-shaped cross-section is formed in a central portion of the lower surface 212 of the tip 210 so as to extend along the axis $O_2$ of the end mill body 201. A side wall surface of the groove 222 faced to the inner peripheral cutting edge 221 of the tip 210 forms an abutment surface 223 for receiving a component force of the cutting feed from the outer peripheral cutting edge 215 upon the cutting operation of the end mill. A side wall surface of the groove 222 faced to the abutment surface 223 forms an abutment surface 224 for receiving a component force of the cutting feed from the inner peripheral cutting edge 221 upon the cutting operation of the end mill.

As shown in FIGS. 29 through 31, the throw-away tip 210 is detachably secured onto a tip seat of the end mill body 201 located at an outer peripheral side thereof and spaced from the axis $O_2$ of the end mill body 201, such that the outer and inner peripheral cutting edges 215 and 221 are positioned at the outer and inner peripheral sides of the end mill body 201, respectively. The tip 210 is fixed by the engagement of a convex portion or projection 205 formed on the tip seat of the end mill body 201, with the groove 222 formed in the lower surface 212 of the tip 210. Similarly to the end mill body 21 described with reference to FIGS. 5 and 6, the core receiving recess 203 is formed at a center of a forward end face of the end mill body 201 so as to extend a predetermined distance from the forward end face along the axis $O_2$ thereof. The recess 203 is provided for receiving therein a core formed on a workpiece upon the cutting thereof due to the fact that the tip 210 is spaced from the axis $O_2$ of the end mill body 201. The tip 210 is mounted on the end mill body 201 so as to expose the inner peripheral cutting edge 221 of the tip 210 into the core receiving recess 203 in the end mill body 201.

The end mill comprising the end mill body 201 and the throw-away tip 210 mounted thereon operates in a manner substantially the same as that in which the end mill described with reference to FIGS. 5 and 6 operates. Moreover, in addition to unexpected meritorious results substantially the same as those obtained by the end mill shown in FIGS. 5 and 6, the end mill shown in FIGS. 29 through 35 can provide such advantages that since the groove 222 is provided in the lower surface 212 of the tip 210 to independently form the abutment surfaces 223 and 224 which respectively receive the component forces of the cutting feed from the respective outer and inner peripheral cutting edges 215 and 221, no shift and play would occur on the tip 210 even if a cutting operation high in cutting load is performed, and it would be possible to have the cutting operation high in accuracy.

FIGS. 36 through 39 show only a throw-away tip 230 for use in an end mill in accordance with an eighth embodiment of the present invention, with an end mill body substantially identical with that shown in FIGS. 29 through 31 being omitted to avoid duplication. The tip 230 has an upper surface 233 having a pair of ridgelines along which two sets of smoothly, convexly curved outer peripheral cutting edges 235a and 235b, linear end cutting edges 236a and 236b, and inner peripheral cutting edges 241a and 241b are formed in a manner of a symmetry of revolution through 180 degrees. Specifically, when one set of the outer peripheral cutting edge 235a, end cutting edge 236a and inner peripheral cutting edge 241a are worn off due to the cutting operation, the tip 230 is revolved through 180 degrees so that the other set of the outer peripheral cutting edge 235b, end cutting edge 236b and inner peripheral cutting edge 241b can successively be utilized. A groove 242 having abutment surfaces 243 and 244 similar to the groove 222 of the seventh embodiment shown in FIGS. 32 through 35 is also formed in a central portion of a lower surface 232 of the tip 230.

FIGS. 40 through 48 show an end mill in accordance with a ninth embodiment of the present invention, which comprises an end mill body 301 having a chip pocket 302 and a core receiving recess 303. The end mill body 301 is substantially similar in structure to the end mill body 21 described with reference to FIGS. 5 and 6 and will not be repeatedly described here. A throw-away tip, generally designated by the reference numeral 325, is detachably secured to the end mill body 301 by a clamping member 304.

Figure 40:
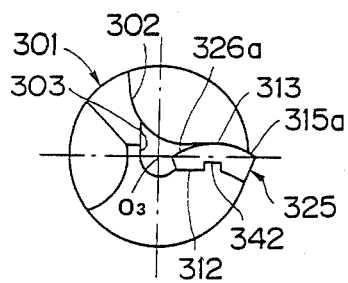
FIG. 40 is a view similar to FIG. 5, but showing a ninth embodiment of the present invention.
Figure 41:
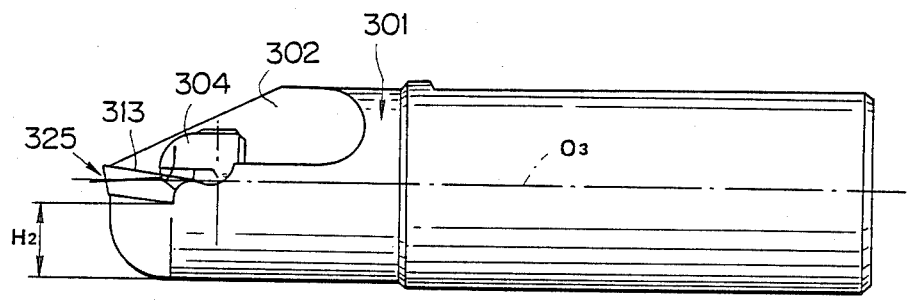
FIG. 41 is a side elevational view of an end mill shown in FIG. 40.
Figure 42:
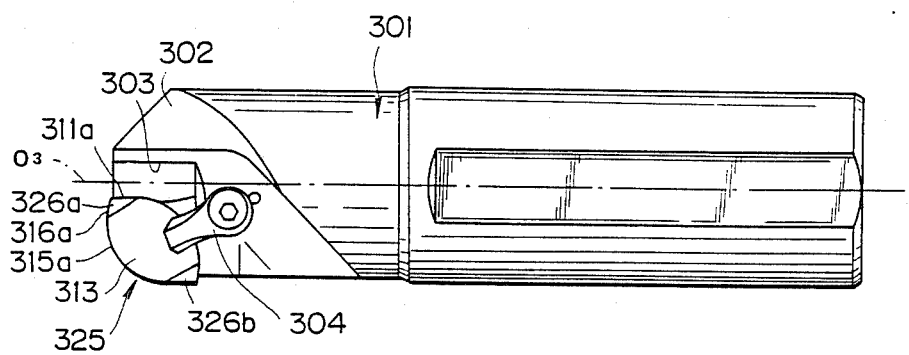
FIG. 42 is a plan view of the end mill shown in FIG. 40.
Figure 43:
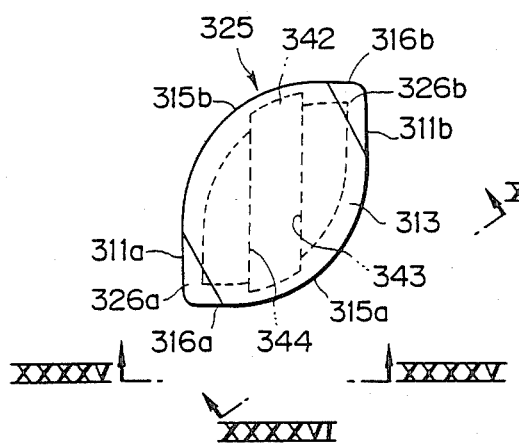
FIG. 43 is a plan view of a throw-away tip shown in FIGS. 40 through 42.
Figure 44:
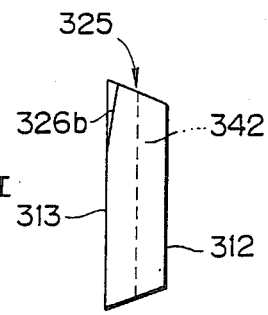
FIG. 44 is a side elevational view of the tip shown in FIG. 43.
Figure 45:
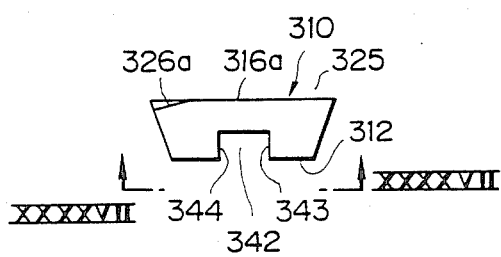
FIG. 45 is a view as viewed from the arrows XXXXV—XXXXV in FIG. 43.
Figure 46:
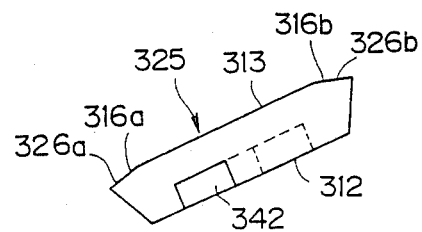
FIG. 46 is a view as viewed from the arrows XXXXVI—XXXXVI in FIG. 43.
Figure 47:
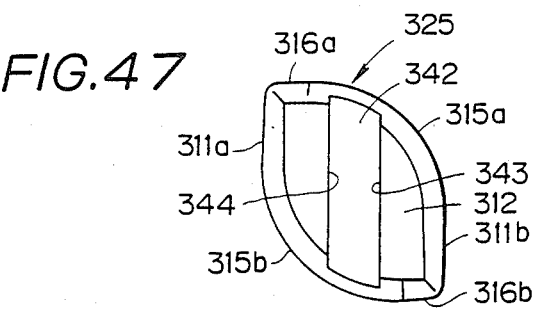
FIG. 47 is a view as viewed from the arrows XXXXVII—XXXXVII in FIG. 45.

As shown in FIGS. 43 through 47, the throw-away tip 325 is generally similar to the tip 230 shown in FIGS. 36 through 39, but an upper surface 313 additionally has corner portions 326a and 326b which are defined by linear end cutting edges 316a and 316b and inner peripheral cutting edges 311a and 311b, respectively. Each of the corner portions 326a and 326b is formed by an inclined planar surface such that a thickness of the tip 325 between the upper surface 313 and a lower surface 312 is progressively reduced toward the extremity of the corner portion 326a, 326b. A groove 342 having abutment surfaces 343 and 344 similar to the groove 222 of the seventh embodiment shown in FIGS. 32 through 35 is also formed in a central portion of the lower surface 312 of the tip 325. As shown in FIGS. 40 through 42, in use, the tip 325 is mounted on a tip seat on the end mill body 301 so that the upper surface 313 is located at a position above an axis $O_3$ of the end mill body 301.

The throw-away tips 230 and 325 of the respective eighth and ninth embodiments shown in FIGS. 36 through 39 and FIGS. 40 through 47 can provide unexpected meritorious results the same as those obtained by the seventh embodiment shown in FIGS. 29 through 35. In addition, the tips 230 and 325 are further advantageous in that since two sets of smoothly, convexly curved outer peripheral cutting edges 235a and 235b; and 315a and 315b, end cutting edges 236a and 236b; and 316a and 316b, and inner peripheral cutting edges 241a and 241b; and 311a and 311b are formed into a symmetrical configuration, when one of the outer peripheral cutting edges 235a, 315a is worn off, the tip 230, 325 is revolved through 180 degrees so that the other outer peripheral cutting edge 235b, 315b and the like opposed to the outer peripheral cutting edge 235a, 315a and the like can be utilized to provide superior economy.

Figure 48:
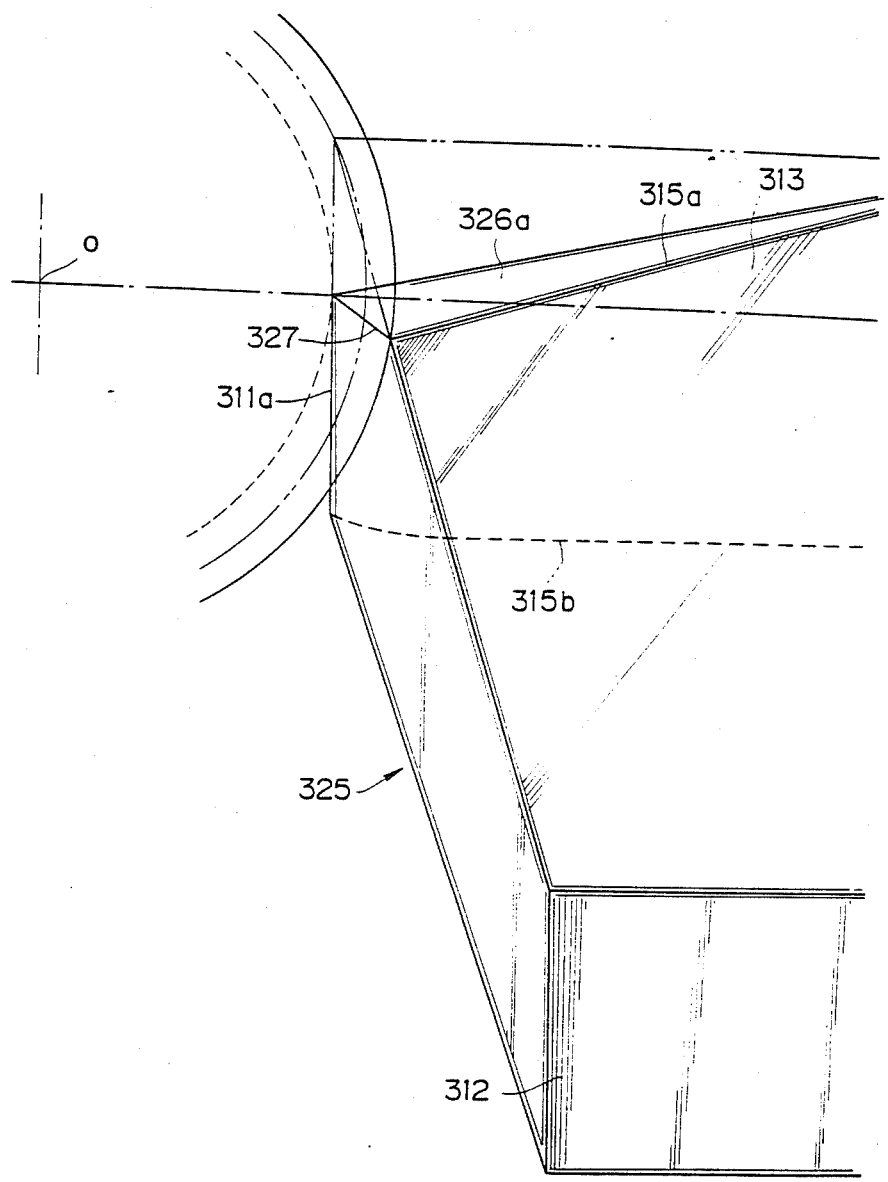
FIG. 48 is a fragmental perspective view of the tip shown in FIGS. 44 through 47.
Figure 49:
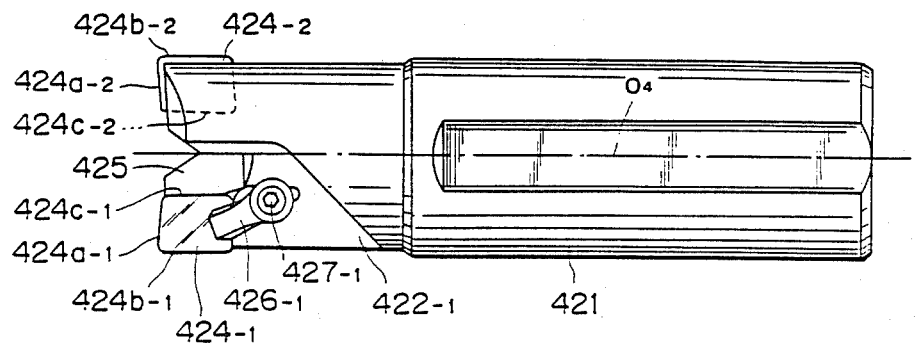
FIG. 49 is a plan view of a tenth embodiment of the present invention.

Moreover, in particular, as shown in FIGS. 40 through 42, even in case where the tip 325 is mounted such that the upper surface 312 is located at a position above the axis $O_3$ of the end mill body 301 and a radial rake angle at the outer peripheral cutting edge 315a is rendered negative, it would be possible to prevent a radial rake angle at a forward end 327 of the inner peripheral cutting edge 311a from being increased in the positive direction as is the case of a tip as indicated by the two-dot-and-chain line in FIG. 48 so that no relief impingement would occur on the flank, since the corner portion 326a adjacent the forward end 327 of the inner peripheral cutting edge 311a is formed by the inclined surface. Accordingly, as shown in FIG. 41, it is possible to secure an increased amount of back metal $H_2$ in the end mill body 301, and it is possible to increase a tool rigidity of the end mill body 301.

Although the seventh, eighth and ninth embodiments have been described as being arranged such that each of the throw-away tips 210, 230 and 325 has the groove 222; 242; 342 formed in the lower surface 212; 232; 312, and the side wall surface of the groove form the abutment surfaces 223 and 224; 243 and 244; 343 and 344 for respectively receiving the component forces of the cutting feed from the respective outer and inner peripheral cutting edges 215 and 221; 235a and 235b; 315a and 315b, the present invention should not be limited to these illustrated embodiments. The throw-away tip may have formed on the lower surface thereof a convex portion or projection having the above-described abutment surfaces. In this case, the end mill body has formed in the tip seat thereof a concave portion or recess into which the projection is snugly fitted, as is the case of the second embodiment shown in FIG. 8.

FIGS. 49 to 52 show a tenth embodiment of the present invention.

Figure 50:
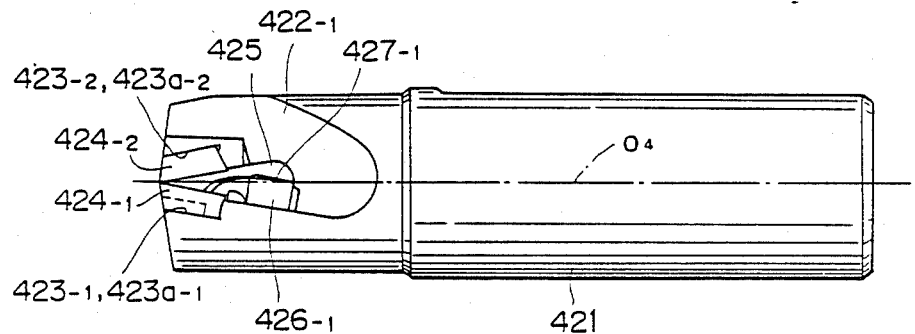
FIG. 50 is a side elevational view of the end mill of FIG. 49.
Figure 51:
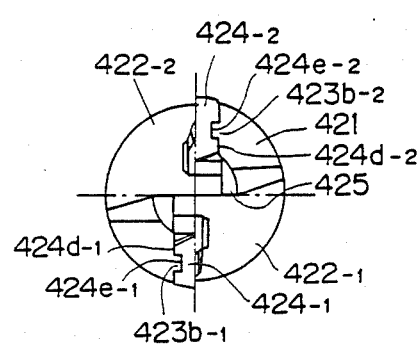
FIG. 51 is a front end view of the end mill of FIG. 49.
Figure 52:
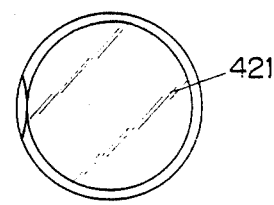
FIG. 52 is a rear end view of the end mill of FIG. 49.

This end mill is similar in construction to that shown in FIGS. 10 to 16 but differs therefrom in that a pair of throw-away tips 424-1 and 424-2 are provided at the forward end portion of an end mill body 421 symmetrically with respect to an axis $O_4$ thereof. Forward end portions of the body 421 are cut away to form a pair of chip pockets 422-1 and 422-2 which are also disposed symmetrically with respect to the axis $O_4$ of the body 421. A tip seat 423 in the form of a recess of rectangular cross section is formed in a part of a wall defining each chip pocket 422, the part of the wall facing in the direction of rotation of the end mill. Projections 423b-1 and 423b-2 both extending in the direction of the axis $O_4$ are provided on bottom surfaces 423a-1 and 423a-2 of the tip seats 423-1 and 423-2, respectively. The tips 424-1 and 424-2 having recesses 424e-1 and 424e-2 complementary to the projections 423b-1 and 423b-2 and formed in their lower surfaces 424d-1 and 424d-2 are fitted to the tip seats 423-1 and 423-2, and fixedly secured thereto by clamping members 426-1 and 426-2, and screws 427-1 and 427-2, respectively. The tips 424-1 and 424-2 are equally spaced from the axis $O_4$ of the end mill body 421. Each of the tips 424-1 and 424-2 has an end cutting edge 424a, an outer peripheral cutting edge 424b and an inner peripheral cutting edge 424c. A radial rake angle of each throw-away tip 424 is set to 0 to 5 degrees and an axial rake angle thereof is set to 5 to 10 degrees, although both of the radial rake angles of the tips 424-1 and 424-2 shown in FIG. 50 are set to 0 degree.

A core receiving recess 425 is formed at a center of the forward end face of the end mill body 421. A distance from the axis $O_4$ to a wall surface of the core receiving recess 425 is set to a value which is equal to or greater than a distance from the axis $O_4$ to either one of the inner peripheral ends of the end cutting edges 424a-1 and 424a-2.

With this end mill, the thrust load is distributed to the two end cutting edges, so that no excessive thrust load is exerted on the inner peripheral portions thereof. Thus, it is possible to prevent the throw-away tips from being chipped or fractured. Furthermore, a cross feed cutting is performed by the inner and outer peripheral cutting edges of both of the tips, and therefore this end mill can withstand an increased cutting load, so that a higher speed cutting operation can be achieved.

With the embodiment shown in FIGS. 49 to 52, only two through-away tips are mounted, however, it will be apparent that the end mill can be easily modified to have more than two (for example, four) tips disposed symmetrically with respect to the axis of the end mill body. It is also possible to modify the end mill so as to mount any ones of the throw-away tips (for example, the throw-away tips 210 shown in FIGS. 32 to 35) of the aforesaid embodiments.

As described above, an end mill in accordance with the present invention comprises a throw-away tip mounted on a forward end of an end mill body in spaced relation to an axis of the end mill body. First one of cutting edge ridges of the throw-away tip, which is located adjacent the forward end of the end mill body and extends from an outer peripheral side of the end mill body toward an inner peripheral side thereof, forms an end cutting edge. The cutting edge ridges of the tip, which respectively extend from outer and inner peripheral ends of the end cutting edge toward a rearward end of the end mill body, form an outer peripheral cutting edge and an inner peripheral cutting edges, respectively.

Since the throw-away tip is spaced from the axis of the end mill body, the inner peripheral end of the end cutting edge and the inner peripheral cutting edge extending from the inner peripheral end of the end cutting edge are also spaced from the axis of the end mill body. Consequently, the inner peripheral end of the end cutting edge and the inner peripheral cutting edge have a relatively high cutting speed, and no excessive thrust load is exerted on the inner peripheral end of the end cutting edge. Thus, it is possible to prevent the throw-away tip, in particular, the end cutting edge thereof from being chipped or fractured. In addition, even in case of the end mill having a large diameter, it is possible to utilize a throw-away tip of a small size without the use of a throw-away tip of a large size, by increasing a distance between the axis of the end mill body to the throw-away tip.

Moreover, although the arrangement, in which the inner peripheral end of the end cutting edge is spaced from the axis of the end mill body, would cause a columnar core to be formed at a center of rotation on a workpiece being cut, the end mill in accordance with the present invention comprises a core receiving recess formed at a center of a forward end face of the end mill body so as to have a size equal to or greater than the distance from the axis of the end mill body to the throw-away tip, so that the core is grown within the core receiving recess. The core is cut away by the inner peripheral cutting edge of the tip when a cross feed cutting is performed by the end mill.

Furthermore, an end mill in accordance with each of the fourth, fifth and sixth embodiments of the invention shown respectively in FIGS. 10 through 18, FIGS. 19 through 23 and FIGS. 24 through 28, comprises a throw-away tip which has an upper surface thereof having a first corner portion defined by a cutting edge ridge utilized as an end cutting edge when the tip is mounted on an end mill body and a second cutting edge ridge utilized as an inner peripheral cutting edge, and a corner portion diagonally opposed to the first corner portion. Each of the corner portions is formed by an inclined surface such that a thickness of the tip between the upper and lower surfaces thereof is progressively reduced from a central portion of the upper surface toward the extremity of the corner portion. With the end mill having the throw-away tip configured as described above, when the tip is mounted on the end mill body so as to have a positive axial rake angle, it is possible to secure a high amount of back metal in the end mill body without the decrease in strength of the tip nose, to thereby provide a high cutting performance. In addition, when the tip is to be mounted on the end mill body, the cutting edge ridge utilized as an outer peripheral cutting edge and the cutting edge ridge utilized as an inner peripheral cutting edge are interchangeable to and from each other. This enables superior economy to be achieved. Further, it is possible to bring a locus of rotation of each point on the cutting edge ridge utilized as an outer peripheral cutting edge into conformity with a generally identical circumference. This enables high cutting accuracy to be achieved.

Additionally, an end mill in accordance with each of the seventh, eighth and ninth embodiments shown respectively in FIGS. 29 through 35, FIGS. 36 through 39 and FIGS. 40 through 48, comprises a throw-away tip in which a smoothly, convexly curved outer peripheral cutting edge is formed by a cutting edge ridge of an upper surface of the tip located at an outer peripheral side of an end mill body, and an inner peripheral cutting edge is formed by a cutting edge ridge of the upper surface located at an inner peripheral side of the end mill body. Abutment surfaces against the end mill body, which respectively receive component forces of the cutting feed from the respective outer and inner peripheral cutting edges, are respectively formed at locations other than the upper surface of the tip. Thus, it is possible to perform the cross feed and axial cuttings with only a single throw-away tip. In addition, should the end mill body have an increased diameter, it would not be required to increase the size of the tip, to thereby provide superior economy.

What is claimed is:

1. An end mill comprising:
   an end mill body having an axis of rotation therethrough and having forward and rearward ends, said forward end having a forward end face and a circumferential surface, said forward end having at least one pocket formed therein and opening to both said circumferential surface and said forward end face, said pocket including a tip receiving recess having a bottom face facing in a direction of rotation of the body, said body having a core receiving recess formed at a center of said forward end face;
   a throw-away tip comprising a plate having upper and lower surfaces, said upper surface having a first cutting edge ridge, a second cutting edge ridge intersecting the first cutting edge ridge and a third cutting edge ridge intersecting the second cutting edge ridge, said tip being releasably mounted in said tip receiving recess with said lower surface held in contact with said bottom face of said tip receiving recess in such a manner that the first cutting edge ridge is located so as to protrude radially outwardly from the circumferential surface to serve an an outer peripheral cutting edge, that the second cutting edge ridge is located so as to protrude forwardly from the forward end face to serve as an end cutting edge, and that the third cutting edge ridge is located so as to protrude radially inwardly of the body into the core receiving recess to serve as an inner peripheral cutting edge, said end cutting edge being inclined toward said rearward end of the body as said end cutting edge approaches the axis of the body; and
   shift preventing means for preventing said throw-away tip from being shifted during a cutting operation of the end mill, said shift preventing means comprising an engaging recess formed in one of the bottom face of the tip receiving recess and the lower surfce of the throw-away tip and extending axially of the body and a projection complementary to said engaging recess of the shift preventing means and formed on the other of the bottom face of the tip receiving recess and the lower surface of the throw-away tip so as to be brought into engagement with said engaging recess of the shift preventing means.

2. An end mill as defined in claim 1, wherein said inner peripheral cutting edge being inclined toward the axis of said end mill body as said inner peripheral cutting edge approaches said rearward end of said end mill body.

3. An end mill as defined in claim 1, wherein said outer peripheral cutting edge extends substantially in parallel to the axis of said end mill body.

4. An end mill as defined in claim 1, wherein said outer peripheral cutting edge is inclined toward the axis of said end mill body as said outer peripheral cutting edge approaches said rearward end of said end mill body.

5. An end mill as defined in claim 1, wherein said recess of said shift preventing means has a generally U-shaped cross-section.

6. An end mill as defined in claim 1, wherein said core receiving recess in said end mill body has a generally semicircular cross-section.

7. An end mill as defined in claim 1, wherein said throw-away tip has a lower surface and a generally rectangular upper surface having four cutting edge ridges, said upper surface having a first corner portion defined by said end cutting edge and said inner peripheral cutting edge, a second corner portion diagonally opposed to said first corner portion and a central portion between said first and second corner portions, each of said first and second corner portions being formed by an inclined surface so that a thickness of said throw-away tip between said lower and upper surfaces thereof is progressively reduced from said central portion toward an extremity of the corner portion.

8. An end mill as defined in claim 7, wherein said inclined surface is planar.

9. An end mill as defined in claim 7, wherein said inclined surface is convexly curved.

10. An end mill as defined in claim 7, wherein said central portion of said upper surface of said throw-awy tip comprises a pair of inclined surface sections located respectively adjacent said first and second corner portions with a single ridgeline being located between said pair of inclined surface sections.

11. An end mill as defined in claim 1, wherein said at least two throw-away tips are provided and mounted on said forward end of said end mill body so as to be spaced from the axis thereof, said at least two throw-away tips being disposed symmetrically with respect to said axis of said end mill body, each of said throw-away tips having a plurality of cutting edge ridges, a first one of said cutting edge ridges being located adjacent said end face of said end mill body and extending from an outer peripheral side of said end mill body toward an inner peripheral side thereof to form an end cutting edge, and second and third ones of said cutting edge ridges extending respectively from outer and inner peripheral ends of said end cutting edge toward said rearward end of said end mill body to form outer and inner peripheral cutting edges, respectively.

12. An end mill as defined in claim 11, wherein said shift preventing means are provided for preventing each said throw-away tips from being shifted during a cutting operation of the end mill.

13. An end mill as defined in claim 11, wherein said end cutting edge of said each throw-away tip is inclined toward said rearward end of said end mill body as said end cutting edge approaches the axis of said end mill body, and said inner peripheral cutting edge of said each throw-away tip being inclined toward the axis of said end mill body as said inner peripheral cutting edge approaches said rearward end of said end mill body.

14. An end mill as defined in claim 13, wherein said outer peripheral cutting edge of said each throw-away tip extends substantially in parallel to the axis of said end mill body.

15. An end mill as defined in claim 13, wherein said outer peripheral cutting edge of said each throw-away tip is inclined toward the axis of said end mill body as said outer peripheral cutting edge approaches said rearward end of said end mill body.

16. The end mill as claimed in claim 1 wherein said tip receiving recess has a generally V-shaped cross-section and extends axially of said body, said lower surface of the throw-away tip being complementary in shape to said tip receiving recess so as to be brought into engagement with the tip receiving recess, said tip receiving recess and said lower surface of the throw-away tip cooperating with each other to serve as said shift preventing means.

17. An end mill as defined in claim 1 or 16, wherein said outer peripheral cutting edge of said throw-away tip is formed by a smoothly, convexly curved cutting edge.

18. An end mill as defined in claim 17, wherein said upper surface of said throw-away tip has a first corner portion defined by said end cutting edge and said inner peripheral cutting edge, a second corner portion diagnonally opposed to said first corner portion and a central portion between said first and second corner portions, each of said first and second corner portions being defined by an inclined surface in such a manner that a thickness of said throw-away tip between said lower and upper surfaces thereof is progressively reduced from said central portion toward an extremity of the corner portion to thereby define on the inner peripheral cutting edge forward and rearward portions, and wherein the disposition of the throw-away tip is such that the throw-away tip is disposed so as to have a negative radial rake at the outer peripheral cutting edge and a positive axial rake, and that the inner peripheral cutting edge is located so that the forward and rearward portions extend radially outwardly of the body as well as in a direction opposite to the direction of rotation of the body from that point of the inner peripheral cutting edge where the forward and rearward portions intersect.

19. An end mill as defined in claim 17, wherein said throw-away tip has a lower surface, an upper surface and first and second abutment surfaces formed at locations other than said upper surface for respectively receiving component forces of a cutting feed from the respective outer and inner peripheral cutting edges.

20. An end mill as defined in claim 19, wherein said throw-away tip has formed in said lower surface thereof a groove having opposite side wall surfaces, said abutment surfaces being formed by said opposite side wall surfaces, respectively.

21. An end mill as defined in claim 19, wherein said inner peripheral cutting edge of said throw-away tip is formed by a smoothly, convexly curved cutting edge.

22. An end mill as defined in claim 21, wherein said upper surface of said throw-away cutting means has a first corner portion defined by said end cutting edge and said inner peripheral cutting edge, a second corner portion diagonally opposed to said first corner portion and a central portion between said first and second corner portions, each of said first and second corner portions being formed by an inclined surface so that a thickness of said throw-away cutting means is progressively reduced from said central portion toward an extremity of the corner portion.

23. An end mill as defined in claim 22, wherein said inclined surface is planar.

24. An end mill as defined in claim 1 or claim 16, wherein said upper surface of said throw-away tip is of a generally quadrilateral shape so as to have four cutting edge ridges, said upper surface having a first corner portion defined by said end cutting edge and said inner peripheral cutting edge, a second corner portion diagonally opposed to said first corner portion and a central portion between said first and second corner portions, each of said first and second corner portions being defined by an inclined surface in such a manner that a thickness of said throw-away tip between said lower and upper surfaces thereof is progressively reduced from said central portion toward an extremity of the corner portion to thereby define on the inner peripheral cutting edge forward and rearward portions, and wherein the disposition of the throw-away tip is such that the throw-away tip is located so as to have a nagative radial rake at the outer peripheral cutting edge and a positive axial rake, and that the inner peripheral cutting edge is located so that the forward and rearward portions extend radially outwardly of the body as well as in a direction opposite to the direction of rotation of the body from that point of the inner peripheral cutting edge where the forward and rearward portions intersect.

25. An end mill as defined in claim 24, wherein said inclined surface is planar so that said forward portion of the inner peripheral cutting edge is straight.

26. An end mill as defined in claim 24, wherein said inclined surface is convexly curved so that said forward portion of the inner peripheral cutting edge is convexly curved.

27. An end mill as defined in claim 24, wherein said central portion of said upper surface of said throw-away tip comprises a pair of inclined surface sections located respectively adjacent said first and second corner portions with a single ridgeline being located between said pair of inclined surface sections.

* * * * *